(12) United States Patent
Foltan et al.

(10) Patent No.: US 7,907,514 B2
(45) Date of Patent: Mar. 15, 2011

(54) MGCP FALLBACK MECHANISM ENHANCEMENT

(75) Inventors: Andrew S. Foltan, Nashua, NH (US);
Alex Urquizo, Andover, MA (US);
Flemming Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1323 days.

(21) Appl. No.: 11/241,679

(22) Filed: Sep. 29, 2005

(65) Prior Publication Data

US 2007/0073891 A1 Mar. 29, 2007

(51) Int. Cl.
*G06F 11/00* (2006.01)
*H04L 1/00* (2006.01)
*H04L 12/26* (2006.01)

(52) U.S. Cl. .......... 370/216; 370/219; 370/220; 370/221

(58) Field of Classification Search .......... 370/216–228; 709/230, 231
See application file for complete search history.

(56) References Cited

U.S. PATENT DOCUMENTS

| | | | | |
|---|---|---|---|---|
| 6,173,312 | B1 * | 1/2001 | Atarashi et al. | 709/203 |
| 6,515,985 | B2 * | 2/2003 | Shmulevich et al. | 370/356 |
| 6,785,223 | B1 * | 8/2004 | Korpi et al. | 370/218 |
| 6,839,344 | B1 * | 1/2005 | Couillaud et al. | 370/353 |
| 7,133,891 | B1 * | 11/2006 | Uceda-Sosa et al. | 709/203 |
| 7,333,492 | B2 * | 2/2008 | Wu et al. | 370/392 |
| 2004/0199649 | A1 * | 10/2004 | Tarnanen et al. | 709/230 |
| 2005/0286496 | A1 * | 12/2005 | Malhotra et al. | 370/352 |
| 2006/0029083 | A1 * | 2/2006 | Kettlewell et al. | 370/401 |

OTHER PUBLICATIONS

Andreasen, F., and Foster, B., "Media Gateway Control Protocol (MGCP)) Version 1.0," RFC 3435 (Jan. 2003).
"Interworking of Cisco MGCP Voice Gateways and Cisco CallManager Verson 3.1," Cisco Systems, (Jan. 24, 2003).

* cited by examiner

*Primary Examiner* — Salman Ahmed
*Assistant Examiner* — Chuong T Ho
(74) *Attorney, Agent, or Firm* — Hamilton, Brook, Smith & Reynolds, P.C.

(57) ABSTRACT

A mechanism provides for communication of "keep-alive" messages from clients to servers in a packet telephony network environment. The servers may be call agents and the clients may be gateways or MGCP-controlled IP phones. A client (e.g., gateway) registers a virtual endpoint. Upon a period of inactivity in which the client does not receive any commands or acknowledgments from an assigned server (e.g., call agent), the client starts to send keep-alive messages periodically to the server. The keep-alive message may include an endpoint identifier that identifies the registered virtual endpoint. If the server fails to respond to the keep-alive messages after a period of time, the client initiates a fallback mechanism from a first call control protocol (e.g., MGCP) to a second call control protocol (e.g., H.323 or SIP), to provide call control handling using a default application. The keep-alive messages may be sent to other servers among the plural servers that are configured to operate with the client before determining whether to initiate the fallback mechanism. During the fallback state, the keep-alive message may be sent periodically until a response is received from the server. Communications with the assigned server may be reestablished thereupon based on the first call control protocol.

16 Claims, 5 Drawing Sheets

MGCP FALLBACK MECHANISM ENHANCEMENT

BACKGROUND

In packet telephony or Voice over Internet Protocol (VoIP) networks, there are several protocol stacks that have been defined to facilitate the provision of voice, video and other messaging services. These protocol stacks include H.323, Session Initiation Protocol (SIP), Media Gateway Control Protocol (MGCP) and others.

H.323 is a standardized communication protocol that enables dissimilar devices to communicate with each other using a common set of codecs, call setup and negotiating procedures, and basic data transport methods.

The MGCP protocol, defined under Informational RFC 3435 (F. Andreasen, B. Foster, "Media Gateway Control Protocol (MGCP) Version 1.0", RFC 3435, January 2003), incorporated herein in its entirety, is suited for centralized systems controlling IP telephony gateways that operate with endpoints having little or no intelligence, such as analog telephones. MGCP is a plain-text, master/slave protocol that allows call control devices, also referred to as call agents or more generally as servers, to take control of a specific port on a gateway or on an MGCP-controlled IP phone, also referred to more generally as a client or MGCP endpoint. MGCP messages between call agents and MGCP endpoints are sent with Internet Protocol over User Datagram Protocol (IP/UDP). No voice data is transmitted through the MGCP protocol itself. Rather, all the voice data transfer occurs directly between the gateways.

PacketCable is an industry-wide initiative for developing interoperability standards for multimedia services over cable facilities using packet technology. PacketCable developed protocols called Network-based Call Signaling (NCS) and Trunking Gateway Control Protocol (TGCP), which both contain extensions and modifications to MGCP while preserving basic MGCP architecture and constructs. NCS is designed for use with analog, single or multi-line user equipment on residential gateways, while TGCP is intended for use in VoIP-to-PSTN trunking gateways in a cable environment. Hereinafter, references to MGCP are defined to include NCS/TGCP unless otherwise noted.

A mechanism is known by which an MGCP media gateway sends periodic notifications to a call agent using empty Notify (NTFY) MGCP commands. If these periodic notifications are not acknowledged by the call agent with successful or unsuccessful response during a configured amount of time, the gateway determines that the call agent is not available. If the call agent is not available, the gateway switches to a fallback state wherein a default call control application (e.g., H.323) is used to establish future calls. Existing MGCP calls remain active during the fallback state until such MGCP calls are released. The gateway continues to send the periodic notifications to the call agent until a response is obtained. Once a response is received, the MGCP session is reestablished. Existing calls that are being handled by the default call control application will remain active until the calls are released.

The known fallback mechanism is based a non-standard use of the NTFY command which does not meet the requirements for proper message handling defined in RFC 3435. Normally under RFC 3435, a NTFY command may be sent only by a media gateway when a preceding NotificationRequest (RQNT) command has been requested by a call agent. However, sending a NTFY command without an associated RQNT command, as is the case with the known fallback mechanism, does not conform to RFC 3435. A second problem relates to the MGCP "disconnected" procedure. When commands such as NTFY are sent to the call agent and no responses are received, the protocol enters a "disconnected" recovery state for the affected endpoints. A keep-alive mechanism by itself, however, should not lead endpoints to enter this "disconnected" state. Hence, the existing NTFY based mechanism requires special non-standard processing on the gateway to avoid this. Finally, the existing mechanism uses an "all-of" wildcard (*) when sending the NTFY, which is explicitly forbidden in MGCP. In summary, the existing mechanism suffers from several protocol violations which, when observed by the call agent, may lead the call agent to disable the endpoints or otherwise fail normal and intended processing. In addition, the known implementation on the gateway requires violating several MGCP requirements which may have further unintended consequences.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The present approach is directed to a mechanism that provides for communication of so-called "keep-alive" messages from clients to servers in a packet telephony network environment. The servers may be call agents and the clients may be gateways or MGCP-controlled IP phones. The present approach facilitates interoperability between gateway and server equipment provided by different vendors.

In one embodiment, a client (e.g., gateway) registers a virtual endpoint. Upon a period of inactivity in which the client does not receive any commands or acknowledgments from an assigned server (e.g., call agent), the client starts to send keep-alive messages periodically to the server. The keep-alive message includes an endpoint identifier that identifies the registered virtual endpoint. If the server fails to respond to the keep-alive messages after a period of time, the client initiates a fallback mechanism from a first call control protocol (e.g., MGCP) to a second call control protocol (e.g., H.323 or SIP), to provide call control handling using a default application. In one embodiment, the keep-alive messages comply with proper message handling in accordance with RFC 3435. For example, the keep-alive message may be according to an MGCP MESG format.

The keep-alive messages may be sent to other servers among the plural servers that are configured to operate with the client before determining whether to initiate the fallback mechanism. During the fallback state, the keep-alive message may be sent periodically until a response is received from the server. Communications with the assigned server may be reestablished thereupon based on the first call control protocol.

Figure 1:
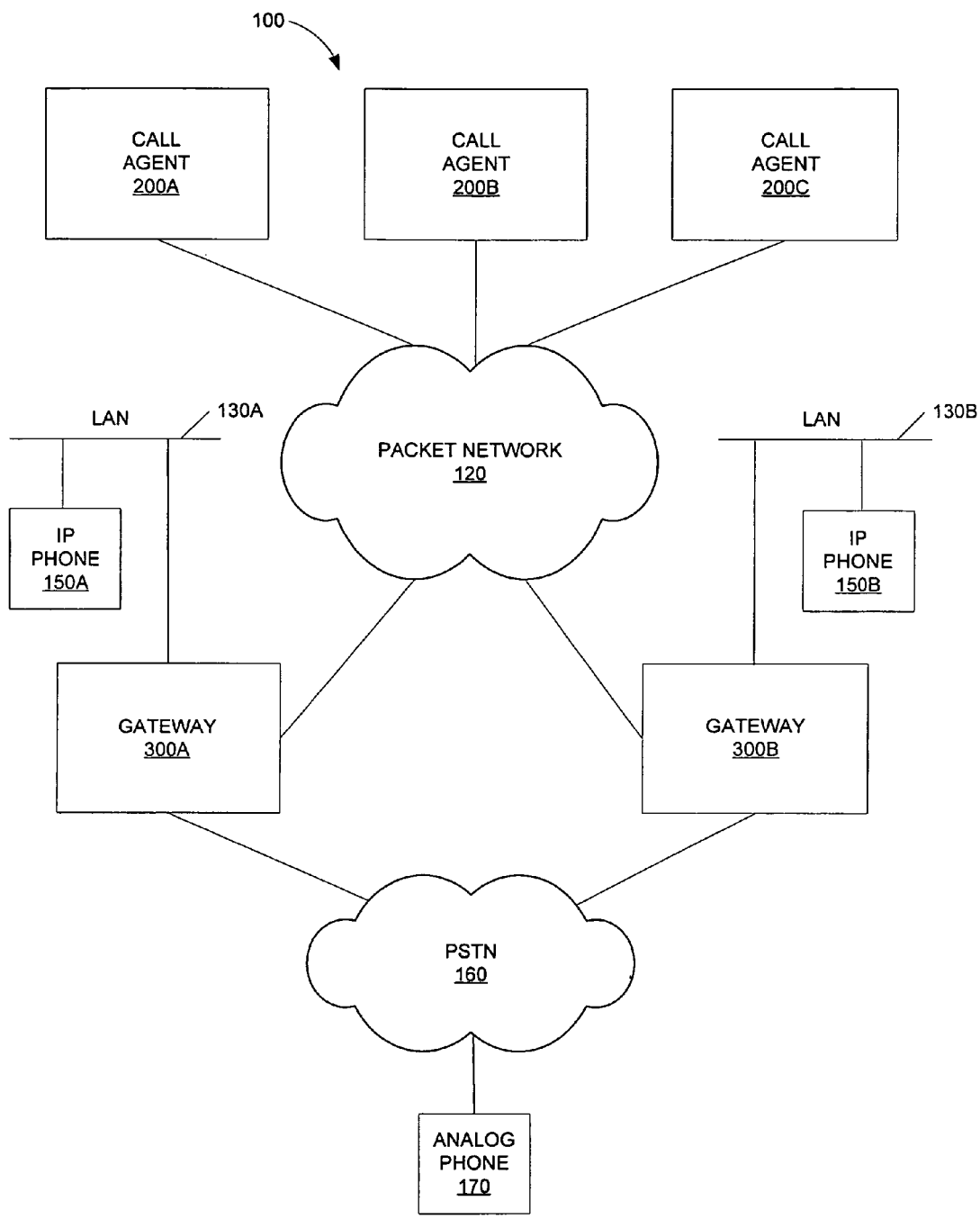
FIG. 1 is a block diagram of an exemplary network configuration that may be used with the present approach.

FIG. 1 is a high-level block diagram of an exemplary network configuration 100 that may implement the present approach. The network configuration includes call agents 200A, 200B, 200C and gateways 300A, 300B coupled to packet network 120. The gateways 300A, 300B are coupled to IP phones 150A, 150B, respectively, through respective local area networks (LANs) 130A, 130B. The gateways 300A, 300B are also coupled to public switched telephone network (PSTN) 160. Analog phone 170 is coupled to the PSTN 160.

The packet network 120 may be implemented as a LAN, wide area network (WAN), global distributed network such as the Internet, Intranet, Extranet or any other form of wireline or wireless communication network. Generally, the network 120 may include any number and combination of routers, hubs, switches, gateways, call agents, endpoints, or other hardware and software, for the communication of packets or other portions of information and control between network components (e.g., call agents, IP phones, MGCP gateways).

In a particular embodiment, network 120 employs voice communication protocols that allow for the addressing or identification of network components coupled to the network 120. For example, using Internet protocol (IP), each of the components coupled together by communication network 120 may be identified in information directed using IP addresses. In this manner, network 120 may support any form and/or combination of point-to-point, multicast, unicast, or other techniques for exchanging media packets among components in communication system 100. Any network components capable of exchanging audio, video, or other data using frames or packets, are included within the scope of the present approach.

Packet network 120 may be directly coupled to other IP networks including, but not limited to, another LAN, or the Internet. In addition to being coupled to other IP networks, network 120 may also be coupled to non-IP telecommunication networks through the use of interfaces or components, for example gateways 300A, 300B. In the illustrated embodiment, packet network 120 is coupled with PSTN 160 through gateways 300A, 300B. PSTN 160 may include switches, central offices, mobile telephone switching offices, pager switching offices, remote terminals, and other related telecommunications equipment.

Technology that allows telecommunications to be transmitted over an IP network may comprise Voice over IP (VoIP), or simply Voice over Packet (Vop). In the illustrated embodiment, IP phones 150A, 150B and gateways 300A, 300B are IP telephony devices. IP telephony devices have the ability of encapsulating a user's voice information (or other input) into IP packets so that the voice can be transmitted over network 120. IP telephony devices may include telephones, fax machines, computers running telephony software, nodes, gateways, or any other devices capable of performing telephony functions over an IP network. The call agents 200A, 200B, 200C may communicate with the MGCP gateways 300A, 300B using MGCP messaging to control the transfer of voice packets between devices. This allows users of IP phones 150A, 150B and analog phone 170 to communicate with each other.

Although FIG. 1 illustrates a particular number and configuration of call agents, gateways, IP phones and analog phones, the communication system 100 contemplates any number or arrangement of such components for communicating media. In addition, the system 100 contemplates arrangements that operate based on NCS for packet cable configurations using media termination adapters (MTAs) and TGCP for trunking gateways.

Figure 2:
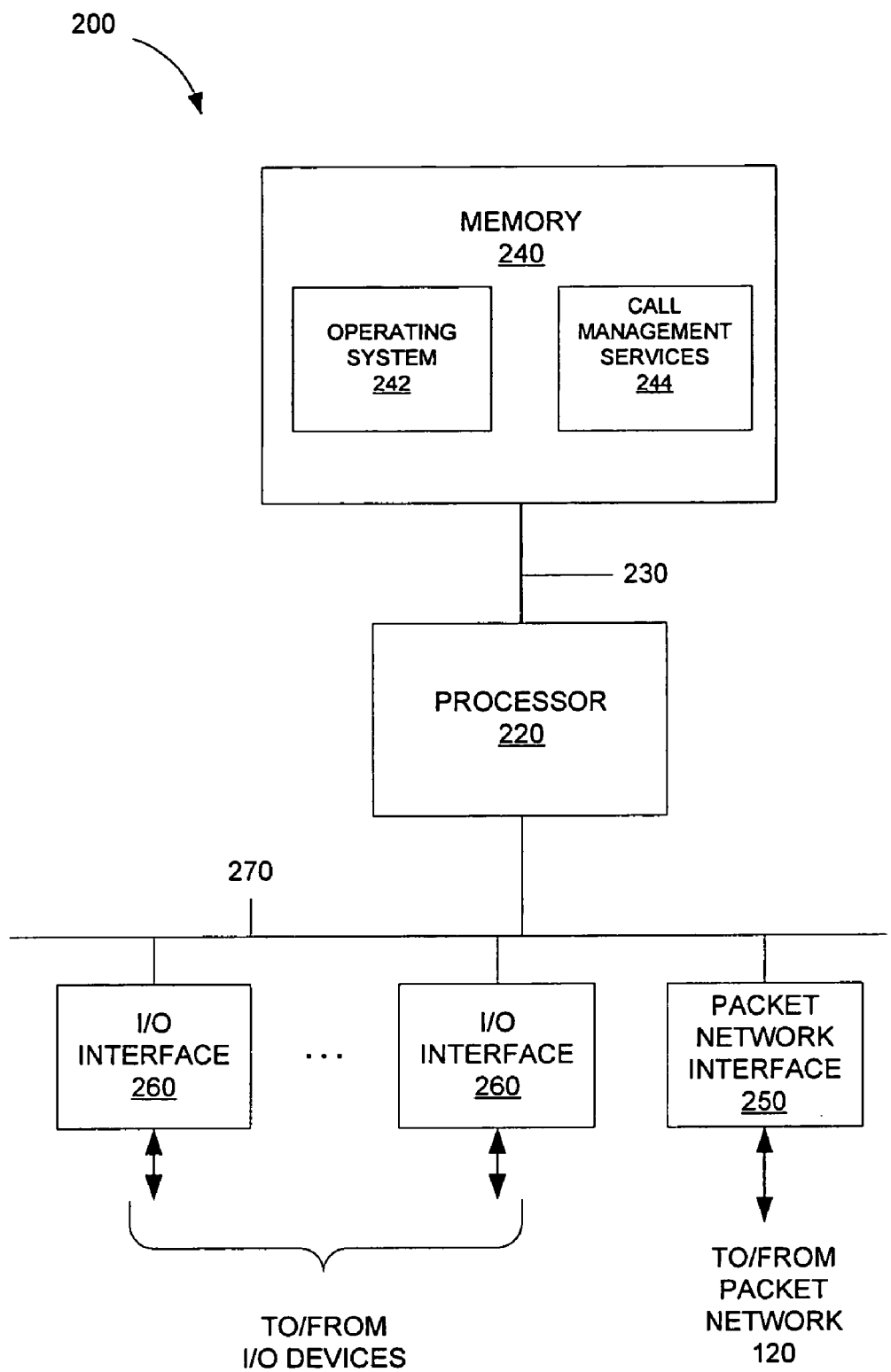
FIG. 2 is a block diagram of a call agent that may be used with the present approach.

FIG. 2 illustrates a high-level partial schematic block diagram of an embodiment of a call agent server 200. The call agent 200 comprises a processor 220, memory 240 coupled to the processor 220 via memory bus 230, packet network interface module 250 and I/O interface modules 260 coupled to the processor 220 via I/O bus 270. The call agent 200 is configured to handle various call control functions associated with VoIP calls (e.g., made in packet network 120 shown in FIG. 1).

The processor 220 is a conventional central processing unit (CPU) configured to execute computer-executable instructions contained in memory 240 including instructions that implement aspects of the present invention. The I/O interfaces 260 are conventional I/O device interfaces that interface the processor 220 with various I/O devices, such as display units, keyboards, disk units and the like. The packet network interface 250 is a conventional network interface (e.g., a network interface card) that interfaces the call agent 200 with the network 120, enabling data packets to be transferred between the call agent 200 and the network 120, and supports various protocols, such as VoIP protocols including MGCP. To that end, interface 250 comprises conventional interface circuitry that incorporates signal, electrical and mechanical characteristics, and interchange circuits, needed to interface with the physical media of the network 120 and protocols running over that media.

Memory 240 is a computer-readable medium organized as random access memory (RAM) and implemented using various RAM devices, such as dynamic random access memory (DRAM) devices. The memory is configured to hold various computer executable instructions and data structures including computer executable instructions and data structures that implement aspects of the present approach. It should be noted that other computer readable mediums, such as disk units and flash memory, may be configured to hold computer readable instructions and data that implement aspects of the present approach. In addition, it should be noted that various electromagnetic signals may be encoded to carry instructions and data that implement aspects of the present approach on a data network.

Memory 240 includes an operating system 242 and call management services module 244. The operating system 242 contains computer executable instructions and data configured to implement various conventional operating system functions that functionally organize the call agent 200. The call management services module 244 contains computer executable instructions and data configured to enable processor 220 to perform functions that include responding to gateway messages in accordance with the present approach.

Figure 3:
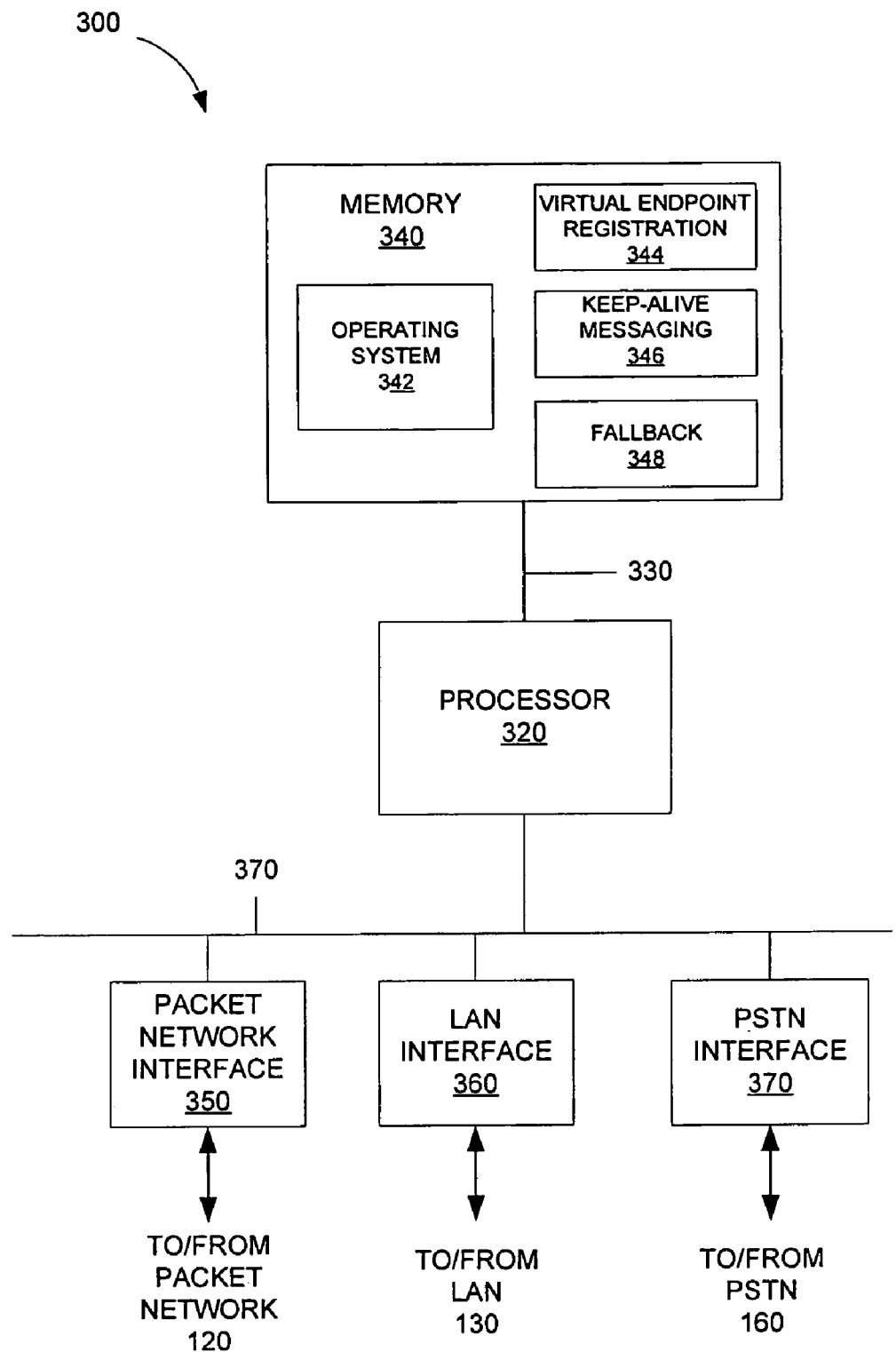
FIG. 3 is a block diagram of a gateway that may be used with the present approach.

FIG. 3 illustrates a high-level partial schematic block diagram of an embodiment of a gateway client 300 that may be used with the present invention. The gateway 300 comprises a processor 320, memory 340 coupled to the processor 320 via memory bus 330, packet network interface module 350, LAN network interface module 360 and PSTN interface module 370 coupled to the processor 320 via I/O bus 370.

Processor 320 is configured to execute computer-executable instructions contained in memory 340 including instructions that implement aspects of the present invention. The packet network interface 350 is a conventional network interface (e.g., a network interface card) that interfaces the gateway 200 with the network 120, enabling data packets to be transferred between the gateway 200 and the network 120, and supports various protocols, such as VoIP protocols including MGCP. The LAN interface module 360 interconnects the gateway 300 with the LAN 130 and enables the gateway 300 to communicate with other components in the LAN, e.g., IP phone 150. The PSTN interface module 370 interconnects the gateway 300 with the PSTN 160 and enables the gateway 300 to communicate with other components in the PSTN. The modules 350, 360 and 370 comprise conventional interface circuitry that incorporates signal, electrical and mechanical characteristics, and interchange circuits needed to interface with the respective physical media and protocols running over that media.

Memory 340 is a computer-readable medium organized as RAM and implemented using various RAM devices, such as DRAM devices. The memory is configured to hold various computer executable instructions and data structures including computer executable instructions and data structures that implement aspects of the present approach. It should be noted that other computer readable mediums, such as disk units and flash memory, may be configured to hold computer readable instructions and data that implement aspects of the present approach. In addition, it should be noted that various electromagnetic signals may be encoded to carry instructions and data that implement aspects of the present approach on a data network.

Memory 340 includes an operating system 342 virtual endpoint registration routine 344, keep-alive messaging routine 346 and fallback routine 348. The operating system 342 contains computer executable instructions and data configured to implement various conventional operating system functions that functionally organize the gateway 300. The virtual endpoint registration routine 344 contains computer executable instructions and data configured to enable processor 320 to perform registration of virtual endpoints with a call agent. The keep-alive messaging routine 346 contains computer executable instructions and data configured to enable processor 320 to send keep-alive messages to a call agent. The fallback routine 348 contains computer executable instructions and data configured to enable processor 320 to implement a fallback process in accordance with the present approach.

The problems with the known fallback mechanism that uses empty NTFY commands in a non-standard manner have been described above. The present approach defines a compliant messaging format and procedures that enable an enhanced fallback mechanism.

The RFC 3435, Appendix B: "Base Package" defines a generic Message command (referred to as "MESG") that the media gateway may send to the call agent. The MESG command as defined in RFC 3435 is intended for general use and allows for extensions. The definition of the MESG command is as follows:
 ReturnCode
 <--Message(EndpointId
   [, ... ])

EndpointId is the name for the endpoint(s) in the gateway which is issuing the MESG command. The identifier must be a fully qualified endpoint identifier, including the domain name of the gateway. The only parameter specified in the definition of the Message command is the EndpointId; however, the RFC 3435 envisioned that extensions may define additional parameters to be used with the MESG command. Such extensions, as long as they do not alter or otherwise interfere with the normal operation of the basic MGCP protocol, may be used to define additional capabilities above and beyond that provided by the basic MGCP protocol.

In accordance with the present approach, a keep-alive message is defined that is formatted using a MESG command. The EndpointId defined in the keep-alive MESG command is a "virtual" endpoint that is defined for the gateway, as provided for in RFC 3435, Appendix E. The virtual endpoint may be treated as a normal endpoint in the media gateway. An RSIP:Restart command may be sent when the media gateway is power cycled or otherwise booted up. In an embodiment, a naming convention for the media gateway virtual endpoint follows the definition in Section E.3 of RFC 3435:
 <virtual-endpoint-type>/<endpoint-#>

Note that <virtual-endpoint-type> is a string that describes the type of endpoint. For example, the string "ka" may be used to indicate "keep alive" to indicate that the virtual endpoint functions to provide keep-alive messages as described herein. Also note that <endpoint-#> refers to a particular endpoint within the device. In an embodiment, a single virtual endpoint is used to send keep-alive messages to all call agents configured for communication with the particular gateway.

As noted above, the Message command may include extensions. In this case, a Reason Code is added to indicate the reason for sending this command to the call agent. An example MESG command is as shown in the following:
 MESG 50 KA/1®gateway.com MGCP 1.0
 E: 801/FB KeepAlives
where the E: parameter indicates the Reason Code defined as "Keep Alives" and FB denotes a Fall Back package that may be defined for this mechanism. The call agent can use this value for its own statistical purposes. In addition, the MESG command may be further extended to provide other information related to this mechanism.

Figure 4:
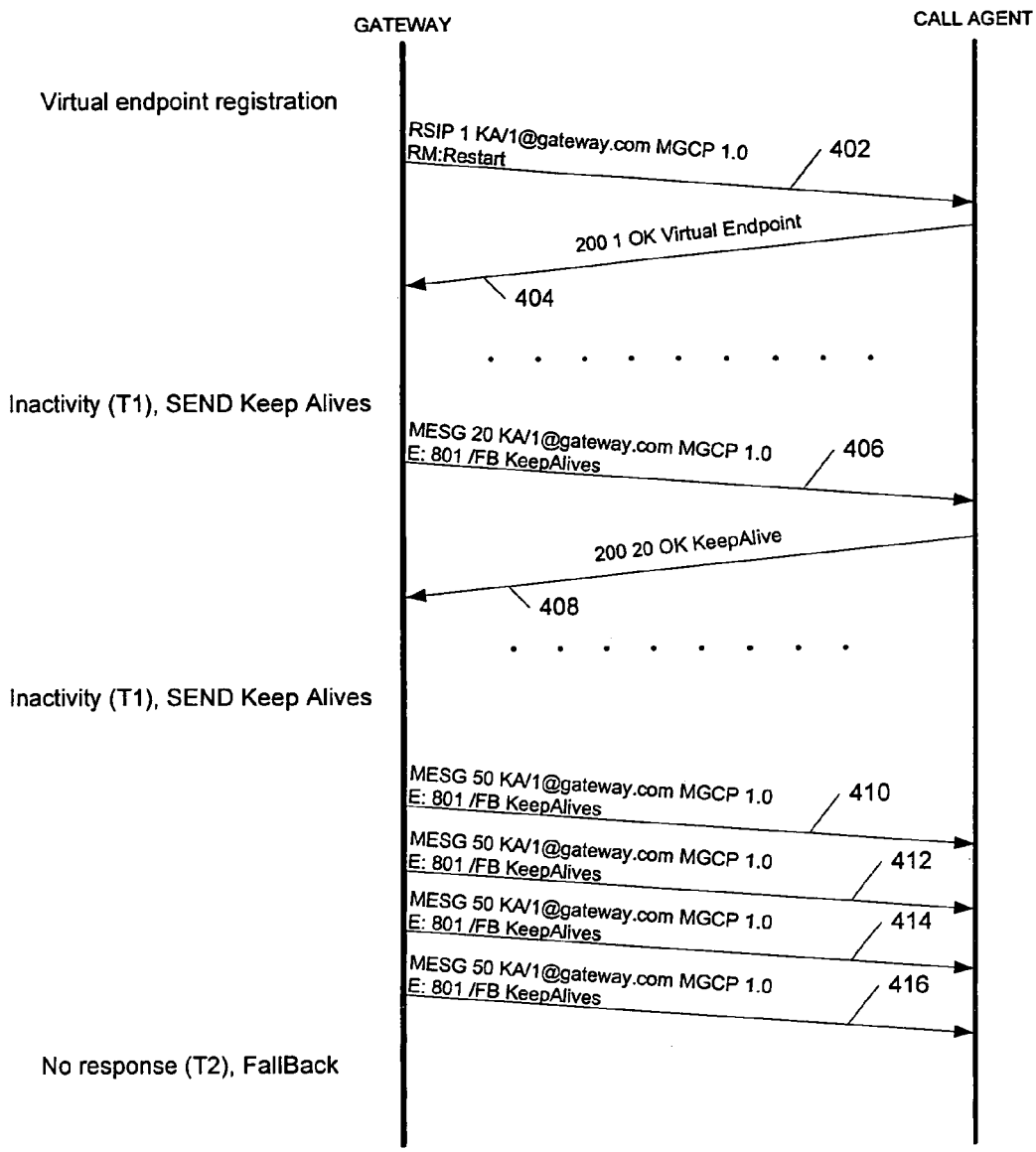
FIG. 4 is a call flow diagram that illustrates an exchange of messages between a gateway and a call agent in accordance with the present approach.

FIG. 4 provides a call flow diagram illustrating an exchange of messages between a gateway and a call agent according to the present approach. Initially, on router boot-up, the media gateway (e.g., gateway 300A, 300B in FIG. 1) registers a virtual endpoint with a call agent that is configured to communicate with the gateway. The registration is made using a RestartInProgress (RSIP) command 402 with the name of the virtual endpoint. The call agent's response 404 is an acknowledgment of the registration of the virtual endpoint. Upon inactivity being detected on the network, i.e., there have been no commands or acknowledgements for a period of time (e.g., time T1), the gateway starts to send one or more keep-alive messages 406 to the call agent. In the illustrated exchange, the call agent responds with an acknowledgment 408, indicating presence of the call agent. After another period of inactivity, the gateway again starts to send keep-alive messages 410 to the call agent. In this example, the first keep-alive message is not acknowledged. The gateway continues to send keep-alive messages 412, 414, 416 to the call agent. After a period T2 of no response to the keep-alive messages from the call agent, the gateway implements a fallback mechanism for call handling. Note that the gateway does not enter the "disconnected" procedure upon failing to receive a response to the keep-alive messages as defined by the MESG command definition in RFC 3435.

MGCP gateway fallback is designed to improve the reliability of PSTN interfaces on MGCP voice gateways in a VoIP network. This feature provides basic call processing support on an MGCP voice gateway when it loses connectivity to all call agents that are configured for the gateway.

If no call agent configured for the gateway is accessible, the gateway, in effect, "falls back" onto itself and uses its default session application (e.g., H.323) to perform basic call-handling functions in support of PSTN interfaces on the gateway.

In an alternate embodiment, the gateway "falls back" to a SIP session application to provide the basic call-handling functions.

In an embodiment, all active MGCP calls are maintained during the fallback transition. Callers are unaware of the fallback transition, and these active MGCP calls are cleared only when the communicating callers hang up. Any transient MGCP calls (that is, calls that are not in the connected state) are cleared at the onset of the fallback transition and may be attempted again later.

When the local MGCP gateway transitions into fallback mode, the default session application (i.e H.323) assumes responsibility for handling new calls. Only basic two-party voice calls are supported during the fallback period.

When the fallback mode is in effect, the affected MGCP gateway repeatedly tries to contact call agents in a prioritized configuration list (notified entity). The MGCP gateway accomplishes this by sending the MESG command as described previously. This process continues until one of the call agents in the prioritized list responds. Upon response, the gateway reverts to MGCP mode. All endpoints that are inactive will register with the responding call agent using a Restart-in-Progress (RSIP) message. Active calls being handled by the default application will register with the responding call agent once the active call is finished (caller hangs up). In the meantime, the latter calls are considered out-of-service for the respondgin call agent.

Figure 5:
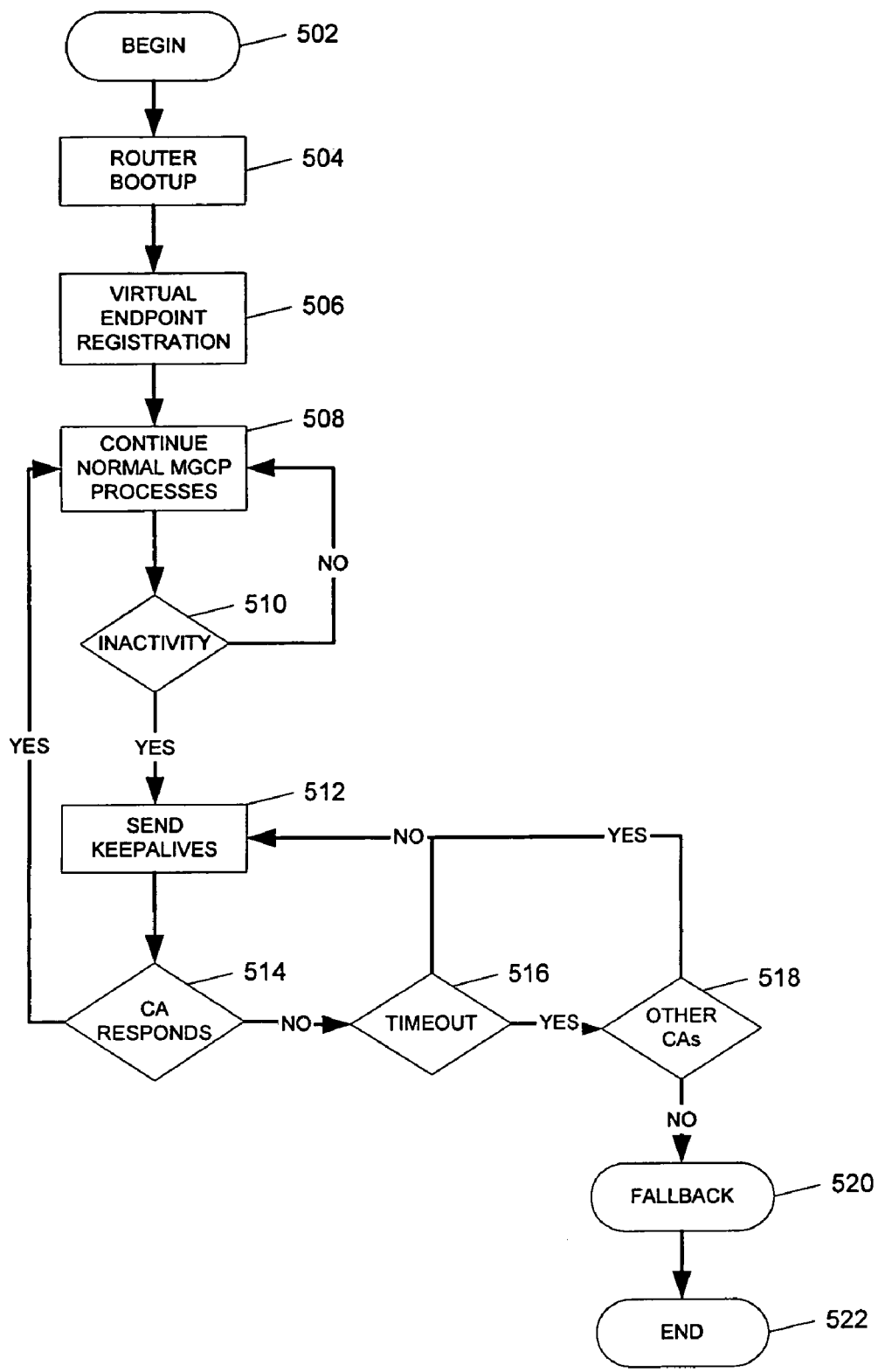
FIG. 5 is a diagram that illustrates a process flow that may be used by a gateway in accordance with the present approach.

FIG. 5 is a diagram that illustrates a process flow that may be used by a gateway according to the present approach.

At the start 502, the router boot-up 504 is followed by virtual endpoint registration 506. As noted with FIG. 4, the virtual endpoint registration identifies to the call agent the endpoint identifier which will send keep-alive messages. Normal MGCP call processing between the gateway and the call agent continues at 508. After a period of inactivity (e.g., time T1) at 510, the gateway at 512 starts sending keep-alive messages to the configured call agent using the MESG format described earlier. If the call agent responds at 514, then normal MGCP call processing continues at 508. If the call agent does not respond at 514, then after a timeout period T2 at 516, the gateway attempts to send keep-alive messages to other call agents known to the gateway at 518. If one of these call agents responds, then call processing continues based on communicating with the responding call agent at 508. If none of the other call agents responds, then at 520 the gateway reverts to fallback, as described earlier, until communication with a call agent is restored.

It should be noted that functions performed by embodiments that implement aspects of the present invention, may be implemented in whole or in part using some combination of hardware and/or software. It should be further noted that computer-executable instructions and/or computer data that implement aspects of the present invention may be stored in other computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a data network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communication by a client over a network having plural servers, one of the servers assigned to the client, the method comprising:
   registering a virtual endpoint with the assigned server;
   upon inactivity with the assigned server, sending a keep-alive message to the server, the keep-alive message including an endpoint identifier that identifies the registered virtual endpoint;
   upon failure to receive a response to the keep-alive message from the assigned server, initiating a fallback mechanism from a first call control protocol to a second call control protocol; and
   sending keep-alive messages to other servers among the plural servers that are configured to operate with the client before determining whether to initiate the fallback mechanism.

2. The method of claim 1 wherein the keep-alive message is according to an MGCP MESG format.

3. The method of claim 1 wherein the first call control protocol is MGCP and the second call control protocol is H.323.

4. The method of claim 1 wherein the first call control protocol is MGCP and the second call control protocol is Session Initiation Protocol.

5. The method of claim 1 wherein sending includes sending the keep-alive message periodically until a response is received from the server.

6. The method of claim 5 further including reestablishing communications with the assigned server based on the first call control protocol.

7. The method of claim 1 wherein the client is a gateway or media termination adapter and the servers are call agents in a VoIP network.

8. A method of communication by a gateway over a VoIP network having plural call agents, one of the call agents assigned to the gateway, the method comprising:
   establishing communications with the assigned call agent based on Media Gateway Control Protocol (MGCP);
   registering a virtual endpoint with the assigned call agent;
   upon a period of inactivity with the assigned call agent, sending an MGCP MESG message to the call agent, the MGCP MESG message including an endpoint identifier that identifies the registered virtual endpoint;
   upon failure to receive a response to the keep-alive message from the assigned call agent, initiating a fallback mechanism from MGCP to a second call control protocol; and
   sending MGCP MESG messages to other call agents among the plural call agents that are configured to operate with the gateway before determining whether to initiate the fallback mechanism.

9. The method of claim 8 wherein the second call control protocol is H.323.

10. The method of claim 8 wherein the second call control protocol is Session Initiation Protocol.

11. The method of claim 8 wherein sending includes sending the MGCP MESG message periodically until a response is received from the call agent.

12. The method of claim 11 further including reestablishing communications with the assigned call agent based on MGCP.

13. A client for communicating over a network having plural servers, one of the servers assigned to the client, the client comprising:

a virtual endpoint registration routine for registering a virtual endpoint with the assigned server;

a keep-alive messaging routine for sending a keep-alive message to the server upon inactivity with the assigned server, the keep-alive message including an endpoint identifier that identifies the registered virtual endpoint;

a fallback routine for initiating a fallback mechanism from a first call control protocol to a second call control protocol upon failure to receive a response to the keep-alive message from the assigned server; and wherein the keep-alive messaging routine sends keep-alive messages to other servers among the plural servers that are configured to operate with the client before the fallback routine initiates the fallback mechanism.

14. The client of claim 13 wherein the keep-alive message is according to an MGCP MESG format.

15. The client of claim 13 wherein the first call control protocol is MGCP and the second call control protocol is H.323 or Session Initiation Protocol.

16. The client of claim 13 wherein the client is a gateway or media termination adapter and the servers are call agents in a VoIP network.

* * * * *